United States Patent [19]

Browne et al.

[11] Patent Number: 5,228,702
[45] Date of Patent: Jul. 20, 1993

[54] MOLDED PLASTIC GASKET HAVING A COMBINATION SEALING BEAD

[75] Inventors: Vance D. Browne, Arlington Heights; Bhagwan D. Agarwal, Skokie, both of Ill.

[73] Assignee: Fel-Pro Incorporated, Skokie, Ill.

[21] Appl. No.: 876,759

[22] Filed: May 1, 1992

[51] Int. Cl.$^5$ .............................................. F16J 15/10
[52] U.S. Cl. .......................... 277/207 R; 277/235 B; 277/180; 277/211
[58] Field of Search .................. 277/207 R, 211, 213, 277/235 B, 235 A, 236, 180; 285/917, 910

[56] References Cited

U.S. PATENT DOCUMENTS

| | | | |
|---|---|---|---|
| 3,053,544 | 9/1962 | Gorsica | 277/180 |
| 3,139,009 | 6/1964 | Härting | 277/180 X |
| 3,166,332 | 1/1965 | Olson | 277/180 X |
| 3,191,950 | 6/1965 | Hiltner | 277/211 X |
| 3,930,656 | 1/1976 | Jelinek | 277/180 |
| 4,140,323 | 2/1979 | Jacobs | 277/180 X |
| 4,388,259 | 6/1983 | Jewell et al. | |
| 4,519,619 | 5/1985 | Doyle | 277/180 X |
| 4,676,515 | 6/1987 | Cobb | 277/235 B |
| 4,743,421 | 5/1988 | McDowell et al. | 277/235 B X |
| 4,817,969 | 4/1989 | McDowell et al. | |
| 4,830,698 | 5/1989 | DeCore et al. | 277/235 B X |
| 4,973,067 | 11/1990 | Fritz | 277/211 X |
| 5,150,910 | 9/1992 | Udagawa | 277/235 B |

FOREIGN PATENT DOCUMENTS

| | | | |
|---|---|---|---|
| 557334 | 5/1957 | Belgium | 277/211 |
| 970950 | 12/1958 | Fed. Rep. of Germany | 277/213 |
| 2849018 | 5/1980 | Fed. Rep. of Germany | 277/235 B |
| 3741344 | 6/1989 | Fed. Rep. of Germany | 277/235 B |
| 399100 | 3/1966 | Switzerland | 277/206 A |
| 831964 | 4/1960 | United Kingdom | 277/213 |

*Primary Examiner*—William A. Cuchlinski, Jr.
*Assistant Examiner*—Scott W. Cummings
*Attorney, Agent, or Firm*—Dressler, Goldsmith, Shore, Sutker & Milnamow, Ltd.

[57] ABSTRACT

A plastic gasket having a combination sealing bead surrounding a service opening. The bead includes an embossment having a projection extending outwardly of one surface of the gasket body and defining a recess opening outwardly of the other surface of the gasket body. A sealing bead element is disposed in the recess to assist in effecting a seal when the gasket is clamped between a pair of flanges.

11 Claims, 2 Drawing Sheets

MOLDED PLASTIC GASKET HAVING A COMBINATION SEALING BEAD

BACKGROUND OF THE INVENTION

The present invention relates to molded gaskets, and especially to high temperature-resistant molded plastic gaskets for use in connection with automotive engines and in other environments where similar service conditions are encountered.

A wide variety of gaskets have been suggested in the prior art for automotive and other uses. Some such gaskets have been molded of high temperature plastics and have used sealing beads to enhance their sealing characteristics. For example, in U.S. Pat. No. 4,817,969 a molded, fiber filled plastic gasket has sealing beads which are integrally formed with the gasket body. The bead is preferably trapezoidal in cross-section and extends above the surface of the main body a distance of from about at least five percent to about fifteen percent of the thickness of the main body. Desirably a pair of recesses are provided in the main body at the base of and immediately adjacent to each sealing bead. The recesses accommodate some flow of the resin forming the bead under high sealing loads to reduce the possibility of stress-cracking of the sealing beads.

It would be desirable to provide improved gaskets for sealing joints, such as joints in automotive engines, and in particular to provide molded plastic gaskets having improved, integrally formed beads which function to seal without requiring excessively high clamping loads and which are adapted for use in a wide variety of environments.

SUMMARY OF THE INVENTION

A gasket of the present invention comprises a thin main gasket body having expansive main surfaces defining a plurality of openings including at least one service opening. The gasket body defines a combination sealing bead means surrounding the service opening. The combination sealing bead means comprises a continuous projection extending outwardly from one main surface and defining a continuous, complementary concave recess which opens outwardly of the other main surface, and a continuous sealing bead element in the recess. The sealing bead element projects in a direction opposite to the associated projection.

When the gasket is clamped between a pair of flanges, the projection and the sealing bead element cooperate to effect seals with the flanges thereat. Desirably the gasket body is a synthetic thermoplastic material and the sealing bead means is formed integrally therewith, as by molding the gasket body and sealing bead means together.

Preferably the sealing bead element is disposed within the concave recess and does not extend outwardly of the concave recess beyond the other main surface prior to clamping the gasket between a pair of flanges. In a most preferred form the continuous projection and recess define a continuously curved embossment in cross-section and the sealing bead element is centrally located in the embossment.

In one form the gasket may have a pair of generally concentric combination sealing beads surrounding the service opening, in which each of the combination sealing beads has a continuous projection defining a concave recess and a sealing bead element in the recess. The projections may extend outwardly from the same main surface or from different ones of the main surfaces.

Further objects, features and advantages of the present invention will become apparent from the following drawings and description thereof.

DETAILED DESCRIPTION

Figure 1:
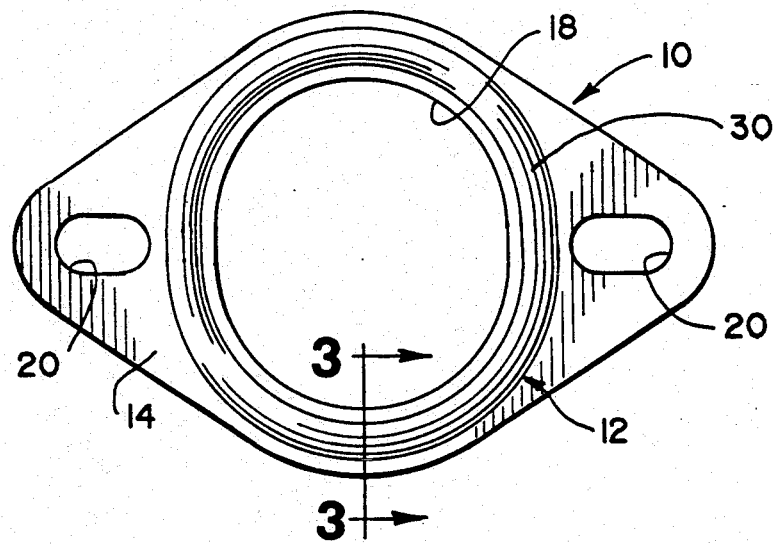
FIG. 1 is a top p view of a gasket of the present invention.
Figure 2:
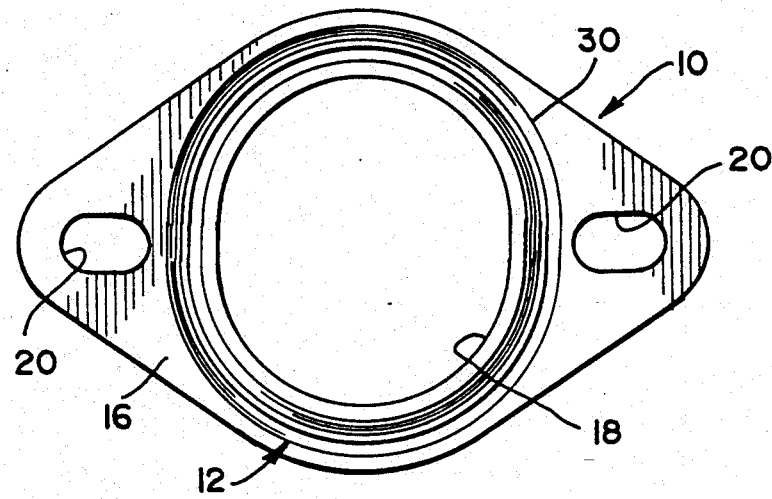
FIG. 2 is a bottom plan view of the gasket of FIG. 1.
Figure 3:
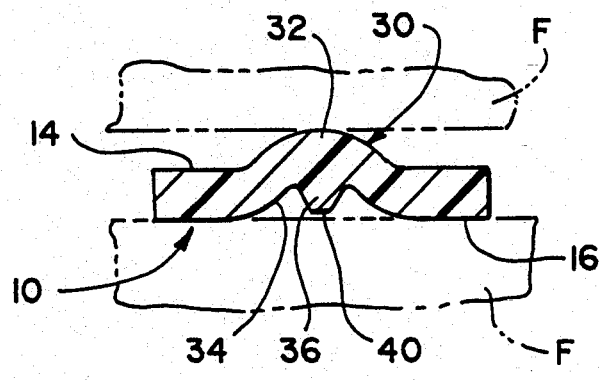
FIG. 3 is a cross-sectional view taken along line 3—3 of FIG. 1.

Referring first to FIGS. 1-3, an exemplary gasket of the present invention is there shown. Illustrative gasket 10 may be an automobile water outlet gasket which may be molded or otherwise formed of a plastic sheet, such as nylon. Gasket 10 is adapted for use in an automotive engine assembly in an environment where hot water or coolant flows and must accommodate to service temperatures which may be ambient initially and which in use are hot.

Gasket 10 has a generally flat main body 12 having expansive main upper and lower surfaces 14 and 16, respectively, and defines at least one service opening 18. Gasket 10 is adapted to be disposed between a pair of confronting flanges such as flat flanges F illustrated in dotted line in FIG. 3 and also defines further openings, such as a pair of bolt holes 20, for securing the gasket to the flanges.

As best seen in FIG. 3, the gasket body 12 defines a sealing bead means such as a continuous sealing bead 30 which surrounds the service opening 18. Bead 30 includes a continuous projection 32 extending outwardly and above one main surface such as surface 14 and defines a continuous, complementary concave recess 34 which opens outwardly of the other, lower main surface 16. In addition, combination sealing bead 30 defines a further continuous sealing bead element 36 in the concave recess 34 which extends in a direction opposite to the projection 32.

In a preferred form, as seen in FIG. 3, the sealing bead element 36 is trapezoidal in configuration, with the base of the trapezoid formed with the body of the gasket. The free end portion 40 of the bead element 36 does not extend outwardly of the concave recess beyond main surface 16 prior to clamping of the gasket 10 between a pair of flanges F to effect a seal with the flanges. A presently preferred sealing bead comprises a continuously curved embossment in cross-section with the sealing bead element being located centrally and symmetrically in the concave recess of the embossment. Typically the projection will seal and accommodate to larger scale deformations, whereas the sealing bead element will accommodate to local compressibility and conformability needs, such as unevenness of the flange surfaces, and the like.

As illustrated in FIGS. 1–3, sealing bead 30 is integrally formed, as by molding, with the main body of gasket 10 and is of a synthetic plastic material, most preferably a thermoplastic material of which nylon is one example. A typical nylon suitable for molding exemplary gasket 10 is a nylon 66 available from Bay Resin as PA-113. Other nylons, as well as other plastics such as polypropylene, polyethersulfones, polyetherimides, etc., may be used as well, with or without fillers, such as of the types described in U.S. Pat. No. 4,817,969.

Figure 9:
FIG. 9 shows a prior art bead configuration for comparative purposes.

Gaskets 10 made in accordance with FIGS. 1 to 3 have been tested and compared to gaskets having flat bodies with oppositely directed trapezoidal beads as illustrated in FIG. 9. It was determined that the sealing effect of the sealing bead construction of FIGS. 1–3 under load was significantly better, demonstrating that the combination sealing bead having a bead element within the recess of an embossed bead performed in a significantly improved manner, i.e., required less load for equivalent sealing. That is clearly very advantageous, for example, where clamping loads are limited, where it is desirable to be able to use more clamping load elsewhere in the gasket, etc.

To examine their sealing characteristics, a number of test gaskets having circular beads of the bead configurations illustrated in FIGS. 3 and 9 were prepared. The test gaskets having the bead configuration of FIG. 3 were made of nylon having a main body thickness of 0.032 inch and had a service opening in the gasket of about 1.75 inches in diameter. An encircling embossment about 2.25 inches in diameter projected about 0.025 inch above main surface 14 and defined a recess of about 0.022 inch. The crown of the embossment had a radius of curvature of 0.060 inch taken about a center located on surface 16. The sealing bead element free end portion 40 was 0.015 inch in width and was recessed inwardly of surface 16 by 0.004 inch.

In the gasket of FIG. 9, the materials and body dimensions were similar to those described for the gaskets of FIGS. 1–3, except that the height of the trapezoidal beads was about 0.007 inch. Three gaskets each of the same nylon material were made having the bead structures of FIG. 3 and FIG. 9 as described for each group as follows. The nylon used was the same in all cases and, as indicated, some of the gaskets were glass fiber filled.

| Group | Material | Bead Description |
|---|---|---|
| 1 | Nylon (unfilled) | Combination bead |
| 2 | Nylon (unfilled) | .015" trapezoidal bead |
| 3 | Nylon (10% glass) | Combination bead |
| 4 | Nylon (10% glass) | .015" trapezoidal bead |
| 5 | Nylon (33% glass) | Combination bead |
| 6 | Nylon (33% glass) | .015" trapezoidal bead |

Tests at 50 psig of nitrogen were then conducted under the indicated loads (starting with an underlying base load of 188 pounds calculated from a load area of 3.75 inches × 50 psig). The leak rate in cubic centimeters per minute is shown in the following table. The terms "Off Scale" and "E.O.T." mean that the leakage rate is higher than the instrumentation senses and end of tests, respectively.

| | LOAD | | | | |
|---|---|---|---|---|---|
| | 500 lb | 1000 lb | 1500 lb | 2000 lb | 2500 lb |
| Group 1 | | | | | |
| 1 | 34 | 0 | 0 | E.O.T. | |
| 2 | 56 | 0 | 0 | E.O.T. | |
| 3 | 23 | 0 | 0 | E.O.T. | |
| Group 2 | | | | | |
| 1 | Off Scale | 0 | 0 | E.O.T. | |
| 2 | Off Scale | 0 | 0 | E.O.T. | |
| 3 | Off Scale | 6 | 0 | 0 | E.O.T. |
| Group 3 | | | | | |
| 1 | 60 | 0 | 0 | E.O.T. | |
| 2 | 100 | 0 | 0 | E.O.T. | |
| 3 | 100 | 0 | 0 | E.O.T. | |
| Group 4 | | | | | |
| 1 | Off Scale | 100 | 0 | 0 | E.O.T. |
| 2 | Off Scale | 40 | 0 | 0 | E.O.T. |
| 3 | Off Scale | 100 | 0 | 0 | E.O.T. |
| Group 5 | | | | | |
| 1 | 60 | 0 | 0 | 0 | E.O.T. |
| 2 | Off Scale | 7 | 0 | 0 | E.O.T. |
| 3 | Off Scale | 6 | 0 | 0 | E.O.T. |
| Group 6 | | | | | |
| 1 | Off Scale | 800 | 0 | 0 | E.O.T. |
| 2 | Off Scale | Off Scale | 10 | 0 | 0 |
| 3 | Off Scale | 200 | 0 | 0 | E.O.T. |

It is apparent from the foregoing table that the load required to effectively seal those gaskets having the combination sealing bead, the projection with a bead element within the recess, was less, a distinct advantage for the reasons stated above, among others.

Figure 4:
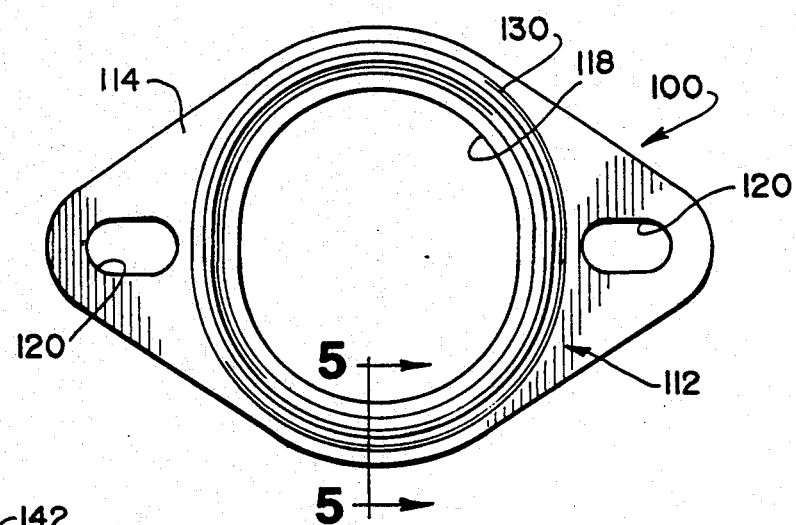
FIG. 4 is a top plan view of a further gasket of the present invention.
Figure 5:
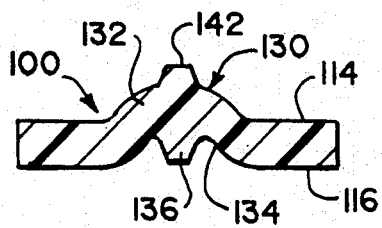
FIG. 5 is a cross-sectional view taken along 5—5 of FIG. 4.

FIGS. 4 and 5 illustrate another gasket 100 employing the principles of the present invention. Thus, gasket 100 may be a water outlet gasket having a flat main body 112, upper and lower surfaces 114, 116, respectively and a service opening 118, and bolt holes 120. A combination sealing bead 130 includes a continuous outwardly extending projection 132 and a complementary continuous concave recess 134 which opens outwardly of main surface 116. A continuous sealing bead element 136 is provided in recess 134. It extends in a direction opposite to projection 132 and is positioned entirely within recess 134. An additional bead element 142 projects from the crown of the projection 132 and cooperates with the sealing bead structure 130 to effect a seal between confronting flanges.

Figure 6:
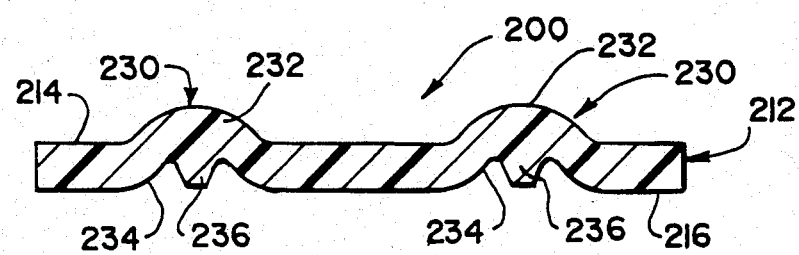
FIG. 6 is a cross-sectional view, like that of FIGS. 3 and 5, of yet another gasket of the present invention.
Figure 7:
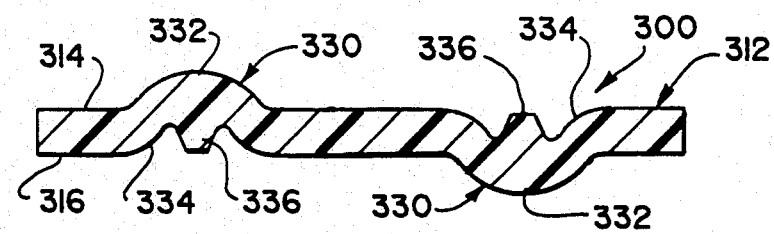
FIG. 7 is a cross-sectional view, like that of FIGS. 3 and 5, of still another gasket of the present invention.
Figure 8:
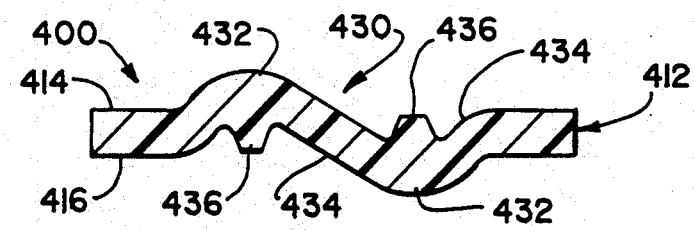
FIG. 8 is a cross-sectional view, like that of FIGS. 3 and 5 of a further gasket of the present invention.

FIGS. 6, 7 and 8 illustrate further embodiments which incorporate the principles of the present invention. Each defines a pair of generally concentric continuous sealing beads surrounding a service opening, such as an opening 18. Each incorporates a bead element within a recess in each of the pair of recesses to enhance the sealing effect of the associated gasket.

As may be seen from FIG. 6, like gasket 10, gasket 200 may be a water outlet gasket having a flat main body 212, upper and lower surfaces 214 and 216 and a service opening and bolt holes. A pair of concentric, continuous combination sealing beads 230 are provided. Each includes a continuous outwardly extending projection 232 and a complementary concave recess 234 which opens outwardly of main surface 216. A sealing bead element 236 is provided in each recess 234. Bead elements 236 extend in a direction opposite to projections 232 and are positioned entirely within their associated recesses 234. The use of a pair of such encircling beads enhances the sealing effect of the gasket assembly.

Gasket 300 of FIG. 7 may be a water outlet gasket having a flat main body 312, upper and lower main surfaces 314 and 316, and a service opening and bolt holes. A pair of concentric, continuous combination sealing beads 330 are provided. Each includes a continuous outwardly extending projection 332 and a concave recess 334, one of which opens outwardly of main surface 316 and the other of which opens outwardly of surface 314. A sealing bead element 336 is provided in each recess 334. The sealing bead elements extend in directions opposite to those of the projections 332 and are positioned entirely within their associated recesses 334. The use of the pair of beads to encircle an associated service opening provides enhanced sealing characteristics.

FIG. 8 illustrates another gasket 400. Like the others has a flat main body 412, upper and lower surfaces 414, 416 and suitable service openings and bolt holes. A sealing bead construction 430 is provided which includes a pair of continuous outwardly extending projections 432 which merge with each other at adjacent edges thereof and which project in opposite directions from main surfaces 414, 416, respectively. Each projection defines a concave recess 434 opening outwardly of the opposite main surface. A sealing bead element 436, which may be trapezoidal in cross-section, is provided in each recess and extends in a direction opposite to that of the associated projection. Preferably each sealing bead element 436 is positioned entirely within its associated recess 434.

It will be apparent to those skilled in the art from the foregoing that modifications may be made without departing from the spirit and scope of the present invention. For example, the shapes of the sealing beads, the projections, and the sealing bead elements may be varied to suit the particular application and environment. The plastic used may be varied and may employ fillers appropriate to the particular use and environment. The gaskets may be injection molded or may be formed integrally in other ways appropriate to the gasket and the use to which it is to be put. Accordingly, the invention is not intended to be limited, except as may be required by the appended claims.

What is claimed is:

1. A gasket comprising a thin main gasket body of a synthetic plastic material having expansive main surfaces defining a plurality of openings including at least one service opening, said gasket body defining a combination sealing bead means surrounding said service opening, said sealing bead means comprising a continuous projection extending outwardly from one of said main surfaces and defining a continuous, complementary concave recess which opens outwardly of said other of said main surfaces, and a continuous sealing bead element integrally formed with said main gasket body and being of the same material, said sealing bead element being disposed in said recess, said sealing bead element projecting in a direction opposite to said projection and being of a width narrower than said recess, whereby when said gasket is clamped between a pair of flanges, said projection and said sealing bead element cooperate to effect seals with said flanges thereat.

2. The gasket in accordance with claim 1, and wherein said synthetic plastic material is a thermoplastic material.

3. The gasket in accordance with claim 2, and wherein said gasket body and sealing bead means are molded together.

4. The gasket in accordance with claim 3, and wherein said gasket is formed of nylon.

5. The gasket in accordance with claim 1, and wherein said sealing bead element is disposed within said concave recess and does not extend outwardly of said concave recess beyond said other main surface prior to clamping the gasket between a pair of flanges.

6. The gasket in accordance with claim 1, and wherein said continuous projection and recess define a continuously curved embossment in cross-section and said sealing bead element is centrally located in said embossment.

7. The gasket in accordance with claim 1, and wherein a pair of continuous generally concentric sealing bead means are provided to surround said service opening, each of said combination sealing bead means having a continuous projection defining a concave complementary recess and a sealing bead element in said recess.

8. The gasket in accordance with claim 7, and wherein said projections extend outwardly from the same main surface.

9. The gasket in accordance with claim 7, and wherein said projections extend outwardly from different ones of said main surfaces.

10. The gasket of claim 9, and wherein said projections merge with said other at adjacent edges of each other.

11. The gasket in accordance with claim 1, and wherein a further continuous sealing element is formed with the crown of the projection.

* * * * *

UNITED STATES PATENT AND TRADEMARK OFFICE
CERTIFICATE OF CORRECTION

PATENT NO. : 5,228,702

DATED : July 20, 1993

INVENTOR(S) : Browne, et al.

It is certified that error appears in the above-identified patent and that said Letters Patent is hereby corrected as shown below:

At column 2, line 8, "p" should be --plan--;

At column 4, lines 5-25, the designation --Leak Rate (cc/min.)-- should appear at the left of the chart.

Column 6,
Claim 10, line 2, "said" should read --each--.

Signed and Sealed this

Fifth Day of April, 1994

Attest:

BRUCE LEHMAN

Attesting Officer

Commissioner of Patents and Trademarks